United States Patent Office 3,133,808
Patented May 19, 1964

3,133,808
HERBICIDE COMPOSITION
Philip C. Hamm, Webster Groves, Mo., assignor to Monsanto Chemical Company, St. Louis, Mo., a corporation of Delaware
No Drawing. Filed Mar. 16, 1959, Ser. No. 799,484
17 Claims. (Cl. 71—2.7)

This invention relates to a new class of valuable herbicidal compositions. More specifically the invention relates to modifications and formulations of the nitrogen substituted α-haloacetamides which have a greater utility because of the expanded spectrum of herbicidal activity without inhibiting certain vegetable crop plants.

The N-substituted α-haloacetamide herbicides are in part described and their herbicidal use claimed in United States Patent Nos. 2,863,752, 2,864,679 and 2,864,683. In these patents it is pointed out that the molecular configuration of the substituents on the amide nitrogen atoms are very critical and only compounds with certain substituents are capable of use as herbicides. Compounds which do not have the specified atomic arrangements are of little or no herbicidal value. The groups of compounds described in the above identified patents are unusual in that they are toxic only to certain genera of plants, which include most of the objectionable grass type weeds. The same herbicides are not generally toxic on contact, but are very effective as preemergence herbicides by destroying seeds, by inhibiting the germination of the seeds, by destroying the embryo plants, or by otherwise preventing the normal emergence of the plants from the soil and subsequent growth. Active components may be used either neat or in combination with other active or otherwise beneficial adjuvants.

An effective method of formulating the amide nitrogen substituted α-haloacetamides involves the use of an organic compound which either dissolves or is completely miscible with the toxicant, such as toluene and xylene. The most useful compositions contain also wetting agents or dispersing agents, whereby the formulation upon dilution with water forms a dispersion of the toxicant in the water, such that distribution, for example by spraying, enables a uniform and readily reproducible application to the soil surface. Either solid or liquid nitrogen substituted α-haloacetamides may be formulated in this manner using the amount of solvent necessary to dissolve the selected component.

Solid pulverulent formulations may be prepared from either solid or liquid α-haloacetamides with the critical nitrogen atom substituted by the use of pulverulent additives in sufficient quantity so as to absorb the fluids present. Where the α-haloacetamide component is a solid, smaller quantities of the pulverulent additive may be needed. These solid formulations can be also benefited by the additional incorporation of solvents, such as toluene and xylene, either in small quantities to form a useful solid composition or in larger quantities so as to form a liquid slurry for ready application to the surfaces being treated.

A fundamental purpose of this invention is to provide herbicidal compositions having exceptional activity with respect to the number of objectionable weeds eliminated. A further purpose of this invention is to provide an α-haloacetamide herbicide which, in addition to the usual activity with respect to most grasses, has more complete grass specific activity and also a substantial activity on objectionable broad leaf species of plants. A further purpose of this invention is to provide a readily formed and completely reproducible formulation for use in treating cultivated and planted fields for the purpose of eliminating objectionable plant growth.

It has been found that if certain halogenated toluenes are used in place of the hydrocarbons for the preparation of the readily dispersible liquid formulations, the object of increasing the spectrum of activity is accomplished. If the halogenated toluenes contain only minor proportions of the halogen, the compositions will be liquid and can be used directly in the formulation of the α-haloacetamides. If a larger proportion of the halogens is present in the halogenated toluenes, they may be solid, and it will then be necessary to add a small proportion of unhalogenated toluene or other liquid hydrocarbon to the formulation if a liquid product is desired. Obviously if both the α-haloacetamide toxicant and the halogenated toluenes are normally solid, a larger proportion of some suitable liquid composition will be needed if a liquid product is desired.

It is evident that solid formulations may be made directly when one or both of the α-haloacetamides and the halogenated toluenes are solid compounds. Furthermore, mixtures of two or more active toxicants, the nitrogen substituted α-haloacetamide and/or two or more of the various homologous or isomeric halogenated toluenes, may be present. Often mixtures of the raw materials, from which the nitrogen substituted α-haloacetamides and the halogenated toluenes are synthesized, are more readily available and less costly than are the pure chemical compounds.

The more useful α-haloacetamides are those of the molecular structure

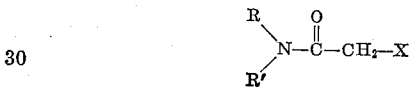

wherein R is selected from the group consisting of hydrogen and the straight chain hydrocarbon radicals having up to four carbon atoms; wherein R' is selected from the group consisting of aliphatic hydrocarbon radicals having up to four carbon atoms, the hydrogen atom, alkoxy alkyl wherein the alkoxy and the alkyl portions have up to four carbon atoms, benzyl, phenyl, furfuryl and cyclohexyl radicals, provided that both R and R' are not hydrogen and further provided that when R' is phenyl, R is not hydrogen; and wherein X is a halogen atom selected from the group consisting of chlorine, bromine and iodine.

All of the compounds embraced by the above structural formula are active preemergence herbicides for the removal of grasses from tilled soil prior to planting or soil pre-planted with crops known to be resistant to the herbicidal effects.

Of especial importance are the substituted α-chloroacetamides of the structure:

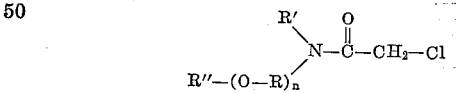

wherein R' is an aliphatic hydrocarbon radical of up to four (4) carbon atoms, wherein R is an alkylene radical from two (2) to four (4) carbon atoms, wherein R" is an aliphatic hydrocarbon radical having up to four (4) carbon atoms, and wherein n is an integer from zero (0) to two (2) inclusive.

In accordance with this invention improved herbicides are prepared by mixing with the α-chloroacetamide halogenated toluenes of the following structure:

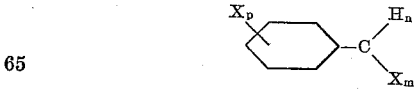

wherein X is selected from the class consisting of chlorine, bromine and iodine, wherein p is in integer from two (2) to five (5) inclusive, wherein m is an integer from zero (0) to three (3) inclusive, wherein n is an integer from zero (0) to three (3) inclusive, and wherein the sum of m and n is always three (3).

The α-haloacetamides with useful nitrogen substituents include the following herbicidal compounds:

(A) N,N-dimethyl α-chloroacetamide
(B) N-ethyl α-chloroacetamide
(C) N,N-diethyl α-chloroacetamide
(D) N-propyl α-chloroacetamide
(E) N,N-di-n-propyl α-chloroacetamide
(F) N-allyl α-chloroacetamide
(G) N,N-diallyl α-chloroacetamide
(H) N-ethyl N-phenyl α-chloroacetamide (N-ethyl α-chloroacetanilid)
(I) N-allyl N-phenyl α-chloroacetamide (N-allyl α-chloroacetanilid)
(J) N-methyl N-phenyl α-chloroacetamide (N-methyl α-chloroacetanilid)
(K) N-propyl N-phenyl α-chloroacetamide (N-propyl α-chloroacetanilid)
(L) N-furfuryl α-chloroacetamide
(M) N-furfuryl N-(m-propyl) α-chloroacetamide
(N) N-furfuryl N-(ethyl) α-chloroacetamide
(O) N-benzyl α-chloroacetamide
(P) N-benzyl N-ethyl α-bromoacetamide
(Q) N-benzyl N-propyl α-chloroacetamide
(R) N-cyclohexyl α-chloroacetamide
(S) N-cyclohexyl N-propyl α-chloroacetamide
(T) N-cyclohexyl N-allyl α-chloroacetamide
(U) N-cyclohexyl N-ethyl α-iodoacetamide
(V) N-(3-ethoxy propyl) α-chloroacetamide
(W) N-(3-ethoxy propyl) N-ethyl α-chloroacetamide
(X) N-ethoxy ethoxyethyl N-allyl α-chloroacetamide
(Y) N-(3-butoxy propyl) N-m-propyl α-chloroacetamide
(Z) N,N-diethyl α-chloroacetamide Useful halogenated toluenes for activating the α-haloacetamide herbicides include the following:

(A) α,x,x,x-Tetrachlorotoluene
(B) α,2,3,6-tetrachlorotoluene
(C) 2,3,6-trichlorotoluene
(D) 2,3,4-trichlorotoluene
(E) α,2,3,4-tetrachlorotoluene
(F) 2,3,5,6-tetrachlorotoluene
(G) α,2,3,5,6-pentachlorotoluene
(H) α,2,3,4,6-pentachlorotoluene
(I) α-Bromo-x,x,x-trichlorotoluene
(J) α,2,4,5-tetrachlorotoluene
(K) α,2,3,5-tetrachlorotoluene
(L) α,2,4,6-tetrachlorotoluene
(M) α,2,4,5-tetrachlorotoluene
(N) x,x,x-Trichlorotoluene
(O) α-Iodo-x,x,x-trichlorotoluene In the above compounds the designation of the position of the chlorine substituent by the letter "x" does not indicate any indefiniteness with respect to the position. The letter merely means that the three halogen atoms are substituted at random and, therefore, a mixture of tetrahalotoluenes exists, each of which has three halogen atoms substituted on the benzene ring. Thus, α,x,x,x-tetrachlorotoluene may be a mixture of two or more of the following compounds: α,2,3,4-tetrachlorotoluene, α,2,3,5-tetrachlorotoluene, α,2,3,6-tetrachlorotoluene, α,2,4,5-tetrachlorotoluene, α,2,4,6-tetrachlorotoluene, and α,3,4,5-tetrachlorotoluene or combinations of any two or more of the possible isomers.

The herbicidal effects of the nitrogen substituted α-haloacetamides, both formulated with aromatic hydrocarbons and with halogenated toluenes, were determined by planting the seeds of various plants of weed type genera and with crop plants, such as corn, leek, peas and sorghum. The planted flats were then sprayed with herbicidal formulations and after a period of ten days the relative phytotoxicity of each candidate herbicide on each of the several types of seed were measured in accordance with the following ratings:

0 _____ No phytotoxicity.
1 _____ Slight phytotoxicity.
2 _____ Moderate phytotoxicity.
3 _____ Severe phytotoxicity.

The following table sets forth the observed data:

| α-Halo-acetamide | Halo-genated toluene | Pounds per acre | Weed genus | | | | | | | | Crop plant | | | | |
|---|---|---|---|---|---|---|---|---|---|---|---|---|---|---|---|
| | | | Bromus | Lolium | Setaria | Digitaria | Ipomoea | Raphanus | Beta | Lycopersicum | Sorghum | Corn | Leek | Peas | Oats |
| A | | 4 | 1 | 2 | 2 | 3 | 1 | 0 | 0 | 0 | 1 | 0 | 0 | 0 | 0 |
| A | E | 2/3 | 1 | 1 | 3 | 3 | 3 | 1 | 3 | 3 | 0 | 0 | 0 | 2 | 0 |
| A | E | 4/3 | 3 | 2 | 3 | 3 | 2 | 2 | 2 | 3 | 3 | 0 | 0 | 3 | 0 |
| A | E | 2/6 | 3 | 3 | 3 | 3 | 3 | 3 | 3 | 3 | 3 | 0 | 1 | 2 | 0 |
| A | E | 4/6 | 3 | 3 | 3 | 3 | 3 | 3 | 3 | 3 | 3 | 0 | 1 | 0 | 0 |
| A | E | 2/9 | 1 | 1 | 3 | 3 | 3 | 2 | 3 | 2 | 0 | 0 | 0 | 0 | 0 |
| A | E | 4/9 | 3 | 3 | 3 | 3 | 3 | 2 | 3 | 2 | 1 | 0 | 0 | 1 | 0 |
| E | | 4 | 3 | 3 | 3 | 3 | 2 | 0 | 0 | 2 | 3 | 0 | 0 | 0 | 3 |
| E | E | 4/6 | 3 | 3 | 3 | 3 | 3 | 3 | 3 | 3 | 3 | 0 | 0 | 3 | 2 |
| G | | 4 | 3 | 3 | 3 | 3 | 0 | 0 | 3 | 3 | 3 | 0 | 1 | 0 | 3 |
| G | C | 2/3 | 3 | 3 | 3 | 3 | 3 | 1 | 3 | 3 | 3 | 0 | 0 | 0 | 3 |
| G | C | 4/3 | 3 | 3 | 3 | 3 | 3 | 3 | 3 | 3 | 3 | 0 | 0 | 1 | 3 |
| G | C | 2/6 | 3 | 3 | 3 | 3 | 3 | 1 | 3 | 3 | 3 | 0 | 0 | 1 | 3 |
| G | C | 4/6 | 3 | 3 | 3 | 3 | 3 | 2 | 3 | 3 | 3 | 0 | 0 | 1 | 3 |
| G | C | 2/9 | 1 | 3 | 3 | 3 | 2 | 3 | 3 | 3 | 3 | 0 | 0 | 2 | 3 |
| G | C | 4/9 | 3 | 3 | 3 | 3 | 3 | 2 | 3 | 3 | 3 | 0 | 0 | 2 | 3 |
| W | | 4 | 3 | 3 | 3 | 3 | 1 | 0 | 0 | 3 | 3 | 0 | 0 | 0 | 3 |
| W | C | 4/6 | 2 | 3 | 3 | 3 | 2 | 1 | 2 | 2 | 0 | 0 | 1 | 0 | 2 |
| H | | 4 | 3 | 3 | 3 | 3 | 0 | 0 | 1 | 3 | 0 | 0 | 0 | 0 | 0 |
| H | I | 4/6 | 3 | 3 | 3 | 3 | 3 | 0 | 3 | 3 | 0 | 0 | 0 | 2 | 0 |
| L | | 4 | 0 | 1 | 2 | 1 | 2 | 0 | 0 | 2 | 1 | 0 | 0 | 0 | 0 |
| L | G | 4/6 | 1 | 0 | 3 | 3 | 3 | 0 | 2 | 0 | 0 | 0 | 0 | 0 | 0 |
| R | | 4 | 3 | 3 | 3 | 3 | 2 | 0 | 0 | 0 | 3 | 0 | 0 | 0 | 3 |
| R | A | 4/6 | 1 | 3 | 3 | 3 | 3 | 1 | 2 | 2 | 0 | 0 | 0 | 0 | 0 |
| F | | 4 | 1 | 3 | 3 | 3 | 0 | 0 | 0 | 0 | 3 | 0 | 0 | 1 | 1 |
| F | A | 4/6 | 3 | 3 | 3 | 3 | 2 | 2 | 3 | 3 | 3 | 1 | 0 | 2 | 3 |

In the above table the letters in the first two columns on the left represent the α-haloacetamides and the halogenated toluenes identified in the tables on columns 3 and 4.

Of particular importance in the practice of this invention are the halogenated toluenes having the halogen atom in the α-position and at least two halogen atoms on the benzene ring. These new compounds are of particular value in the practice of this invention.

Further details of this invention and the results achieved through its use are set forth in the following examples.

Herbicidal compositions with a broad spectrum of activity on weeds can be prepared by mixing the nitrogen substituted α-haloacetamides with the halogenated toluenes, i.e. from one to five parts by weight of the halogenated toluene and from one to five parts of nitrogen substituted α-haloacetamide. The acetamide, which is the principle herbicidal compound, is formulated for application by the use of 0.1 to 25 pounds per acre. A more practicable range of application is from 1 to 10 pounds per acre of the acetamide and from 2 to 30 pounds of the chlorinated toluene.

The more significant use is in the preemergence application for destroying weed seeds and seedlings even after planting the principal crop. There is some variation in the selectivity of the formulation, depending on concentrations and choice of components. The above data shows how the principal deleterious weeds can be eliminated from plantings of corn, leek, peas, sorghum and oats. The soil treatment may be made when the seed is planted by the same operation. The inhibition may retard the weeds until the crop is established so that later weed growth will be retarded by shading. For slow growing crops or in soils which promote the rapid dissipation or decomposition of the active components, a second treatment may be desirable.

The solid formulations, frequently referred to as "dusts," may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus, hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, Fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 55% to 95% by weight, of the entire formulation as applied to plant or soil. More concentrated herbicides will require dilution by the user in order to obtain the most effective treatment of the soil. The concentrated solid herbicidal formulations can be used more effectively if they are mixed with the surface soil by means of a disk-plow or harrow at the time of application.

The liquid compositions for herbicidal use may be solutions or other liquid dispersions. The choice of a liquid medium will depend to some extent upon the physical properties of the active ingredient. The nitrogen substituted α-haloacetamides may be water-insoluble or have limited solubility in water, and aqueous formulations will then necessarily be dispersions of minute drops of the water-insoluble substances in suspension in an aqueous medium. The known water-insoluble substituted α-haloacetamides and the halogenated toluenes of this invention may first be dissolved in a suitable organic solvent and the organic solvent of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10% and frequently as low as 0.05%. In general, concentrations of from 0.5% to 5% are found to be optimum.

Many of the formulations are benefited by the incorporation of other organic solvents for the active components, such as the water immiscible organic alcohols, ketones and hydrocarbons, for example isopropanol, benzene, acetone, methylethyl ketone, kerosene, and chlorinated aliphatic hydrocarbons. The proportions of such organic liquid additives will depend upon the solubility properties of the active ingredient and its use is optional, but as much as 20% may be used in order to provide a uniformly distributed formulation which is capable of maintaining its distributed state during storage, use and after application to the soil or plant surfaces.

Concentrated formulations of the active components may be prepared for dilution in the field to the concentration desired. These may contain from 50 to 98 percent by weight of the active components with the surface active agents and other adjuvants as required. Typical concentrates may comprise 85 to 98 percent active components and from 2 to 15 percent of one or more surface active agents. Other concentrates may contain from 55 to 95 percent of solid pulverulent diluents, sufficient surface active agents and substantial amounts of active components. The concentrates may be diluted with water to the required concentration for application to soil for weed eradication.

By dilution the concentrates are converted into useful formulations for direct use. These formulations may contain from 2 to 25 percent of the mixed α-haloacetamides and halogenated toluenes, with the balance being water and surface active agent, these being present in sufficient quantities to provide a uniform emulsion after being diluted.

A useful formulation of the herbicidal compositions may involve the solid or liquid concentrate of the active ingredient to which has been added formulation aids or conditioning agents, so that the concentrates may be mixed with a suitable extender or dilutent in the field at the time of use. Obviously, for this purpose the dispersing agents will be present in larger concentrations, so that upon dilution with water or a solid extender compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus, a critical aspect of the invention is the fluent carrier without which the optimum herbicidal effects cannot be achieved. Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herebicidal effects by an unskilled operator without elaborate equipment.

In addition to the above described herbicide conditioning agents, other adjuvants may be added, such as insecticides, fungicides, nematocides, and other herbicides. By the use of the subject compounds at the low grass specific levels of application substantial benefits can be obtained by the addition thereto of a broad leaf specific herbicide, for example 2,4-dichlorophenoxy acetic acid and the corresponding esters, amine salts and alkali metal salts, and other herbicidal compounds. In this manner, formulations of efficient and effective use can be provided.

This application is a continuation-in-part of application Serial No. 724,826, filed March 31, 1958, and application Serial No. 726,602, filed April 7, 1958, both now abandoned.

Addendum

The herbicide can be made in a concentrated form containing only the nitrogen substituted α-haloacetamides and the halogenated toluenes with as much surface active agent as is required to provide a uniform emulsion when diluted with water to form a composition for use in the manner described. The formulation as used may contain from 2% to 25% of the mixture of nitrogen substituted α-haloacetamide and halogenated toluene with the balance being water and surface active agent.

What is claimed is:

1. A herbicidal composition comprising from one (1) to five (5) parts by weight of a halogenated toluene having the structural formula:

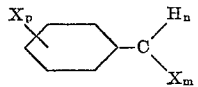

wherein X is a halogen atom, wherein $p$ is an integer from two (2) to five (5) inclusive, wherein $m$ is an integer from zero (0) to three (3) inclusive, wherein $n$ is an integer from zero (0) to three (3) inclusive, and wherein the sum of $m$ and $n$ is always three (3), and from one (1) to five (5) parts by weight of a compound having the structure:

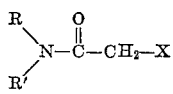

wherein R is selected from the group consisting of hydrogen and the straight chain hydrocarbon radicals having up to four (4) carbon atoms, and wherein R' is selected from the group consisting of aliphatic hydrocarbon radicals having up to four (4) carbon atoms, the hydrogen atom, alkoxy alkyl wherein the alkoxy and the alkyl portions have up to four (4) carbon atoms, benzyl, phenyl, furfuryl and cyclohexyl radicals, provided that both R and R' are not hydrogen and further provided that when R' is phenyl, R is not hydrogen, and wherein X is a halogen atom.

2. A herbicidal composition comprising from one (1) to five (5) parts by weight of a chlorinated toluene having a single chlorine atom substituted on the side chain and having at least two (2) chlorine atoms on the benzene ring, a surface active agent, and from one (1) to five (5) parts by weight of a compound of the structure:

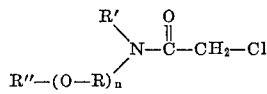

wherein R is an alkylene radical having from two (2) to four (4) carbon atoms, wherein R' and R" are each aliphatic hydrocarbon radicals having up to four (4) carbon atoms, and wherein $n$ is an integer from zero (0) to two (2) inclusive.

3. A herbicidal composition comprising from 1% to 20% of a compound having the structure:

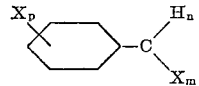

wherein X is a halogen atom, wherein $p$ is an integer from two (2) to five (5) inclusive, wherein $m$ is an integer from zero (0) to three (3) inclusive, wherein $n$ is an integer from zero (0) to three (3) inclusive, and wherein the sum of $m$ and $n$ is always three (3); and from 1% to 20% of a compound having the structure

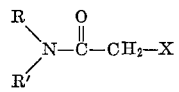

wherein R and R' are straight chain hydrocarbon radicals having up to four (4) carbon atoms, and wherein X is a halogen atom.

4. A herbicidal composition comprising from 1% to 20% of a chlorinated toluene having a single chlorine atom substituted on the side chain and having at least two (2) chlorine atoms on the benzene ring; and from 1% to 20% of a compound of the structure:

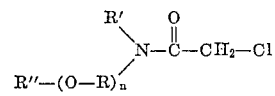

wherein R is an alkylene radical having from two (2) to five (5) carbon atoms, wherein R' and R" are each aliphatic hydrocarbon radicals, and wherein $n$ is an integer from zero (0) to two (2) inclusive; and from 0.05% to 10% of a surface active agent.

5. A herbicidal composition comprising from 1 to 20 percent of a chlorinated toluene having a single chlorine atom substituted on the side chain and at least two chlorine atoms on the benzene ring, and from 1 to 20 percent of a compound of the structure

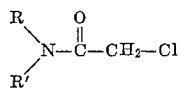

wherein R and R' are straight chain hydrocarbon radicals having up to four (4) carbon atoms; and from 0.05 to 10 percent of a surface active agent.

6. A herbicidal concentrate containing from 50 to 98 percent of a mixture of trichlorobenzylchloride and a compound of the structure

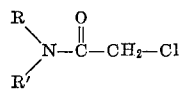

wherein R and R' are each straight chain hydrocarbon radicals having up to four (4) carbon atoms, said mixture consisting from one to five parts by weight of each component; and from 2 to 15 percent of a surface active agent.

7. A herbicidal composition comprising from 1 to 20 percent by weight of trichlorobenzylchloride, from 1 to 20 percent of a compound of the structure

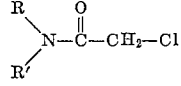

wherein R and R' are each straight chain hydrocarbon radicals having up to four (4) carbon atoms, from 55 to 95 percent of a solid pulverulent diluent, and from 0.05 to 10 percent of a surface active agent.

8. The composition defined by claim 7 wherein the solid pulverulent diluent is granular attapulgous clay.

9. A herbicidal concentrate containing from 50 to 98 percent of a mixture of trichlorobenzylchloride and a compound of the structure

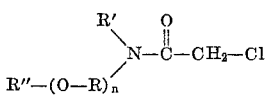

wherein R is an alkylene radical having from two (2) to four (4) carbon atoms and R' and R" are each aliphatic hydrocarbon radicals having up to four (4) carbon atoms and $n$ is an integer from zero (0) to two (2).

10. A herbicidal composition comprising from 1 to 20 percent by weight of trichlorobenzylchloride and from 1 to 20 percent of a compound of the structure

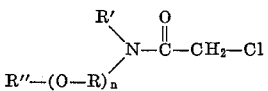

wherein R is an alkylene radical having from two (2) to four (4) carbon atoms and R' and R" are each aliphatic hydrocarbon radicals having up to four (4) carbon atoms and $n$ is an integer from zero (0) to two (2).

11. A herbicidal composition comprising from 2 to 25 percent by weight of a mixture of from one to five parts by weight of trichlorobenzylchloride and one to five parts of a compound having the structure

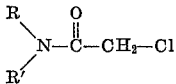

wherein R and R' are each straight chain hydrocarbons having up to four (4) carbon atoms, from 0.5 to 5 percent of a surface active agent, and from 70 to 98 percent water.

12. A herbicidal composition comprising from 2 to 25 percent by weight of a mixture of from one to five parts by weight of trichlorobenzylchloride and one to five parts of a compound having the structure

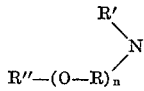

wherein R is an alkylene radical having from two (2) to four (4) carbon atoms and R' and R" are each aliphatic hydrocarbon radicals having up to four (4) carbon atoms, and $n$ is an integer from zero (0) to two (2), from 0.5 to 5 percent of a surface active agent, and from 70 to 98 percent water.

13. A herbicidal composition comprising 1 to 5 parts of N,N-diallyl-alpha-chloroacetamide and from 1 to 5 parts of a mixture of halogenated toluenes having one halogen atom on the side chain and an average of from 2 to 4 halogen atoms on the benzene ring, said halogens being selected from the group consisting of chlorine, bromine and iodine.

14. A herbicidal composition comprising from 1 to 20% by weight of N,N-diallyl-alpha-chloroacetamide and from 1 to 20% of a chlorinated toluene having one chlorine atom on the side chain and an average of from 2 to 4 chlorine atoms on the benzene ring, and from 0.05 to 10% of a surface active agent.

15. A herbicidal composition comprising from 1 to 20% by weight of N,N-diallyl-alpha-chloroacetamide and from 1 to 20% of a chlorinated toluene having one chlorine atom on the side chain and an average of from 2 to 4 chlorine atoms on the benzene ring, and from 55 to 95% of a granular attapulgous clay.

16. A herbicidal concentrate containing from 50 to 98% by weight of a mixture of N,N-diallyl-alpha-chloroacetamide and a chlorinated toluene having one chlorine atom on the side chain and an average of about 3 chlorine atoms on the benzene ring, and from 0.05 to 10% of a surface active agent.

17. A herbicidal composition comprising 1 to 5 parts of N,N-diallyl-alpha-chloroacetamide and 1 to 5 parts of a mixture of chlorinated toluenes having one chlorine atom on the side chain and an average of from 2 to 4 chlorine atoms on the benzene ring.

References Cited in the file of this patent

UNITED STATES PATENTS

| | | |
|---|---|---|
| 2,863,752 | Hamm et al. | Dec. 9, 1958 |
| 2,864,679 | Hamm et al. | Dec. 16, 1958 |
| 2,864,683 | Hamm et al. | Dec. 16, 1958 |
| 2,977,210 | Godfrey | Mar. 28, 1961 |
| 2,977,211 | Godfrey | Mar. 28, 1961 |

FOREIGN PATENTS

| | | |
|---|---|---|
| 785,989 | Great Britain | Nov. 6, 1957 |

OTHER REFERENCES

Simonet et al. in "Société de Biologie," 1939, vol. 131, pages 222 to 224.

Gast et al. in "Agricultural Chemicals," vol. 11, No. 4, April 1956, pages 42 to 44, 136, and 137.